Jan. 9, 1923.

E. H. JONES.
ELECTRIC ARC SOLDERING.
FILED JULY 16, 1919.

1,441,687.

b — case hardening a
base metal rod
(mild steel)

b — case hardening   c — nickel or other metal a
base metal rod
(mild steel)

INVENTOR:
Ernest Henry Jones
By Wm Wallace White
ATT'Y.

Patented Jan. 9, 1923.

1,441,687

UNITED STATES PATENT OFFICE.

ERNEST HENRY JONES, OF LONDON, ENGLAND.

ELECTRIC-ARC SOLDERING.

Application filed July 16, 1919. Serial No. 311,294.

*To all whom it may concern:*

Be it known that I, ERNEST HENRY JONES, subject of the King of Great Britain, residing at 4 Grange Road, Canonbury, London, England, have invented new and useful Improvements in Electric-Arc Soldering, of which the following is a specification.

This invention consists in an improvement in the method of preparing or manufacturing metal electrodes used with an electric arc wherein a metal vase is provided with carbon to suit the particular purpose for which the electrode is required.

Figure 1:
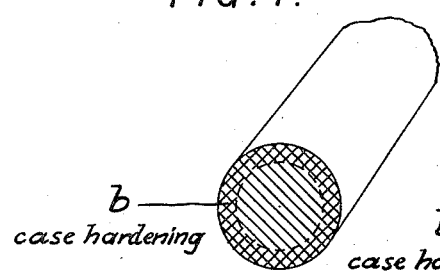
Figure 2:
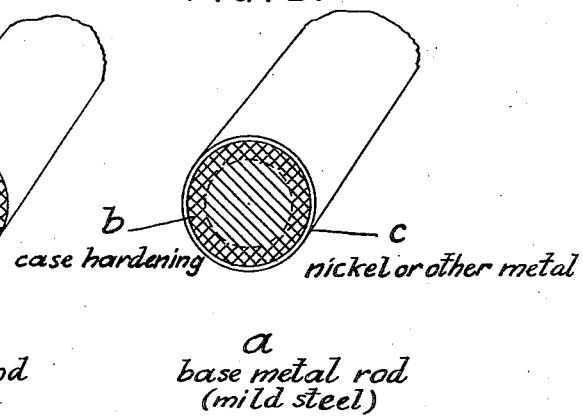

In the accompanying drawings, which illustrate exaggerated sections of electrodes, Fig. 1 represents a mild steel electrode which has been case-hardened; and Fig. 2 illustrates a similar electrode which has been case-hardened and electro-plated with nickel or other metal.

Referring to the drawings, *a* is the mild steel rod and *b* represents the case-hardened surface, while *c* represents the metal coating applied by means of an electro-plating process.

According to this invention an intimate union of the required proportion of the added carbon with the metal base is effected by a suitable case-hardening process.

For this purpose I subject ordinary mild steel rods to a case hardening process, by which means the addition of carbon to the metal base may be easily controlled and gauged by the depth of the casing. The case-hardened rods may be electro-plated with nickel or other metal for electrically welding or depositing upon mild steel or cast iron objects, or other metal objects or articles as found desirable.

The rods prepared in the above manner are provided with a covering of a second class conductor, such as by winding and securing thereon asbestos yarn or other suitable material.

I claim:—

1. A metal electrode for use in depositing and soldering by the electric arc, comprising a rod formed of a suitable base metal and a covering of carbon intimately united with the base metal, as set forth.

2. A metal electrode for use in depositing and soldering by the electric arc, comprising a rod formed of mild steel and an addition of carbon thereto effected by a suitable case-hardening process, as set forth.

3. A metal electrode for use in depositing and soldering by the electric arc, comprising a rod formed of mild steel, an addition of carbon to said rod by a suitable casehardening process, and a covering of a second-class conductor, as set forth.

In testimony whereof I have signed my name to this specification.

ERNEST HENRY JONES.